(12) United States Patent
Woo

(10) Patent No.: US 12,091,300 B2
(45) Date of Patent: Sep. 17, 2024

(54) APPARATUS FOR FIXING PRESSURE VESSEL

(71) Applicants: HYUNDAI MOTOR COMPANY, Seoul (KR); Kia Corporation, Seoul (KR)

(72) Inventor: Myeong Nam Woo, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 362 days.

(21) Appl. No.: 17/525,137

(22) Filed: Nov. 12, 2021

(65) Prior Publication Data

US 2022/0194218 A1    Jun. 23, 2022

(30) Foreign Application Priority Data

Dec. 23, 2020  (KR) ................ 10-2020-0182477

(51) Int. Cl.
*F17C 13/08*  (2006.01)
*B60K 15/067*  (2006.01)
(Continued)

(52) U.S. Cl.
CPC ........ *B66F 9/07518* (2013.01); *B60K 15/067* (2013.01); *B66F 9/20* (2013.01); *F17C 13/084* (2013.01); *B60K 2015/03315* (2013.01); *B60K 2015/03453* (2013.01); *E02F 9/0883* (2013.01); *F17C 2201/0109* (2013.01); *F17C 2201/056* (2013.01); *F17C 2201/058* (2013.01); *F17C 2203/0604* (2013.01); *F17C 2203/0663* (2013.01); *F17C 2205/0107* (2013.01); *F17C 2205/013* (2013.01);
(Continued)

(58) Field of Classification Search
CPC ................ B66F 9/07518; F17C 13/084; F17C 2205/0169; F17C 2205/0161; F17C 2205/00; F17C 2205/0107; F17C 2205/0111

See application file for complete search history.

(56) References Cited

U.S. PATENT DOCUMENTS 3,099,497 A * 7/1963 Albert .................... B65G 53/22
                                              118/DIG. 5
8,016,300 B2 * 9/2011 Cramer .................... B65G 7/04
                                              137/899.3
(Continued)

FOREIGN PATENT DOCUMENTS

EP           0086241 A1 *  8/1983
JP        2004315209 A  *  11/2004

OTHER PUBLICATIONS

Feldbinder et al., Semi-trailer Motor Vehicle for The Transportation of Dust and Free-flowing Products, Particularly of Pulverized Coal, Aug. 24, 1983, EPO, EP 0086241 A1, Machine Translation of Description (Year: 1983).*

*Primary Examiner* — James A English
(74) *Attorney, Agent, or Firm* — MORGAN, LEWIS & BOCKIUS LLP

(57) ABSTRACT

The present disclosure relates to an apparatus for fixing a pressure vessel, the apparatus including: a frame part disposed separably from a subject and configured to support a pressure vessel; and a lifting device configured to selectively raise or lower the frame part relative to the subject, thereby facilitating a process of replacing the pressure vessel.

18 Claims, 16 Drawing Sheets

(51) Int. Cl.
*B66F 9/075* (2006.01)
*B66F 9/20* (2006.01)
B60K 15/03 (2006.01)
E02F 9/08 (2006.01)

(52) U.S. Cl.
CPC ............... *F17C 2205/0169* (2013.01); *F17C 2205/0188* (2013.01); *F17C 2221/012* (2013.01); *F17C 2223/0123* (2013.01); *F17C 2223/036* (2013.01); *F17C 2265/066* (2013.01); *F17C 2270/0168* (2013.01); *F17C 2270/0171* (2013.01)

(56) References Cited

U.S. PATENT DOCUMENTS

| | | | |
|---|---|---|---|
| 2014/0061266 A1* | 3/2014 | Milton | B60K 15/03006 224/404 |
| 2016/0068170 A1* | 3/2016 | Cook | B61C 17/00 312/293.3 |
| 2017/0282710 A1* | 10/2017 | Sloan | F17C 13/084 |
| 2019/0145581 A1* | 5/2019 | Halvorsen | G01D 11/30 248/542 |
| 2022/0243873 A1* | 8/2022 | Woo | E02F 9/207 |

* cited by examiner

APPARATUS FOR FIXING PRESSURE VESSEL

CROSS-REFERENCE TO RELATED APPLICATION

This application claims priority to and the benefit of Korean Patent Application No. 10-2020-0182477 filed in the Korean Intellectual Property Office on Dec. 23, 2020, the entire contents of which are incorporated herein by reference.

TECHNICAL FIELD

The present disclosure relates to an apparatus for fixing a pressure vessel, and more particularly, to an apparatus for fixing a pressure vessel, which may facilitate a process of replacing a pressure vessel.

BACKGROUND ART

A fuel cell vehicle (e.g., a hydrogen fuel cell vehicle) is configured to autonomously generate electricity by means of a chemical reaction between fuel (hydrogen) and air (oxygen) and travel by operating a motor.

In general, the fuel cell vehicle may include a fuel cell stack configured to generate electricity by means of an oxidation-reduction reaction between hydrogen and oxygen, a fuel supply device configured to supply fuel (hydrogen) to the fuel cell stack, an air supply device configured to supply the fuel cell stack with air (oxygen) which is an oxidant required for an electrochemical reaction, and a thermal management system (TMS) configured to discharge heat, which is generated from the fuel cell stack and power electronic parts of the vehicle, to the outside of the system and control temperatures of the fuel cell stack and the power electronic parts.

Meanwhile, various attempts have been made to apply the fuel cell system to construction machines (e.g., excavators) as well as passenger vehicles (or commercial vehicles).

The passenger vehicle operates mainly to travel on a road using a traveling device mounted with tires. Therefore, when the passenger vehicle is required to be refueled, a driver may drive the passenger vehicle to a charging station (hydrogen charging station) located in downtown and refuel the passenger vehicle without significant limitation in respect to a location of the charging station.

In contrast, the construction machine operates mainly to perform construction work (e.g., civil engineering work) at a construction site or in a remote area distant from the downtown and travels using a traveling device mounted with a caterpillar (endless track). For this reason, it is difficult for the construction machine to easily approach a charging station distant from the workplace, and the construction machine is difficult to refuel in a timely manner when the fuel is exhausted.

Therefore, recently, various studies have been conducted to supplement fuel in a timely manner without limitation in respect to the workplace or the fuel charging station, but the study results are still insufficient. Accordingly, there is a need to develop a technology to supplement fuel in a timely manner without limitation in respect to the workplace or the fuel charging station.

SUMMARY

The present disclosure has been made in an effort to provide an apparatus for fixing a pressure vessel, which may facilitate a process of replacing a pressure vessel.

In particular, the present disclosure has been made in an effort to relatively reduce a height at which a pressure vessel is disposed during a process of replacing a pressure vessel.

The present disclosure has also been made in an effort to quickly and accurately replace a pressure vessel regardless of a workplace.

The present disclosure has also been made in an effort to simplify a process of replacing a pressure vessel and improve an operator's satisfaction.

The present disclosure has also been made in an effort to improve safety and reliability and reduce a risk of occurrence of safety accident.

The present disclosure has also been made in an effort to supplement fuel in a timely manner without limitation in respect to a workplace or a fuel charging station.

The objects to be achieved by the embodiments are not limited to the above-mentioned objects, but also include objects or effects that may be understood from the solutions or embodiments described below.

An exemplary embodiment of the present disclosure provides an apparatus for fixing a pressure vessel, including: a frame part disposed separably from a subject and configured to support a pressure vessel; and a lifting device configured to selectively raise or lower the frame part relative to the subject.

This is to facilitate a process of replacing the pressure vessel and supplement fuel in a timely manner.

That is, a construction machine to which a fuel cell system is applied operates mainly to perform construction work (e.g., civil engineering work) at a construction site or in a remote area distant from the downtown and travels using a traveling device mounted with a caterpillar (endless track). For this reason, it is difficult for the construction machine to easily approach a charging station distant from the workplace, and the construction machine is difficult to refuel in a timely manner when the fuel is exhausted.

However, according to the embodiment of the present disclosure, the frame part for supporting the pressure vessel may be separated from the subject, such that the pressure vessel charged with fuel and the frame part configured to support the pressure vessel may be replaced as a whole. Therefore, it is possible to obtain an advantageous effect of supplementing fuel in a timely manner without limitation in respect to a workplace or a fuel charging station when it is necessary to supplement fuel.

Among other things, according to the embodiment of the present disclosure, the frame part may be selectively raised or lowered, such that the height of the frame part may be adjusted to be low during the process of replacing the pressure vessel. Therefore, it is possible to obtain an advantageous effect of minimizing the occurrence of safety accident and enabling an operator to easily replace the pressure vessel in a safer and more convenient posture.

That is, the construction machine has a high ground clearance unlike a passenger vehicle, which causes a problem that a height at which the pressure vessel is mounted is also set to be high. For example, the pressure vessel may be mounted at a height (e.g., a height of 900 mm or more from the ground) at which a count weight is mounted on the construction machine. As the height at which the pressure vessel is mounted increases, the operator, who performs work for replacing the pressure vessel, may receive a physical load and a risk of occurrence of safety accident increases.

However, according to the embodiment of the present disclosure, the height of the pressure vessel (the height of the frame part) may be reduced during the process of replacing the pressure vessel. Therefore, it is possible to obtain an advantageous effect of reducing a risk of occurrence of safety accident and improving convenience and safety of the process of replacing the pressure vessel.

The frame part may have various structures capable of supporting the pressure vessel on the subject.

For example, the frame part may include: a first frame member; and a second frame member disposed individually and separably from the first frame member, and the pressure vessels may respectively be provided in the first frame member and the second frame member.

According to the exemplary embodiment of the present disclosure, the apparatus may include a clamp member configured to fix the pressure vessel to the frame part.

According to the exemplary embodiment of the present disclosure, the lifting device may selectively raise or lower the frame part between a first position with a first height and a second position with a second height lower than the first height with respect to the subject.

According to the exemplary embodiment of the present disclosure, the lifting device may include: a lifting table on which the frame part is seated; a connection link member having one end rotatably connected to the lifting table and the other end rotatably connected to the subject; and a stretchable part selectively stretchable and configured to connect the lifting table and the subject and, and the lifting table may be raised or lowered between the first position and the second position depending on a change in length of the stretchable part.

Various stretchable means, which may be stretched or compressed in a longitudinal direction, may be used as the stretchable part.

According to the exemplary embodiment of the present disclosure, the stretchable part may include a cylinder having one end connected to the lifting table and the other end connected to the subject, the cylinder having a selectively variable length.

According to the exemplary embodiment of the present disclosure, the apparatus may include a lifting guide part configured to guide the raising or lowering of the frame part relative to the subject.

The lifting guide part may have various structures capable of guiding the raising or lowering of the frame part relative to the subject.

According to the exemplary embodiment of the present disclosure, the lifting guide part may include: a lifting guide member disposed on the subject and having a guide slot; and a guide protrusion disposed on the frame part and accommodated in the guide slot so as to be movable along the guide slot.

As described above, the lifting guide part may guide the raising or lowering of the frame part relative to the subject. Therefore, it is possible to obtain an advantageous effect of minimizing vibration and swaying of the frame part (the pressure vessel) and inhibiting the frame part from separating from a predetermined lifting route when the frame part is raised or lowered.

According to the exemplary embodiment of the present disclosure, the apparatus may include a first rolling member provided in the lifting device so as to be in rollable contact with the frame part.

Since the lifting device has the first rolling member as described above, the frame part may move relative to the lifting device as the first rolling member rolls. Therefore, the operator may move (push or pull) the frame part with a comparatively small effort. As a result, it is possible to obtain an advantageous effect of further simplifying the process of replacing the pressure vessel and improving the convenience.

According to the exemplary embodiment of the present disclosure, the apparatus may include a first accommodation portion disposed on the frame part, and configured to selectively accommodate the first rolling member so as to restrict a rolling motion of the first rolling member relative to the frame part.

Since the first rolling member is accommodated in the first accommodation portion when the frame part is disposed at the reference mounting position as described above, it is possible to obtain an advantageous effect of inhibiting the inadvertent movement and separation of the frame part seated on the lifting device and stably maintaining the seated (arranged) state of the frame part.

According to the exemplary embodiment of the present disclosure, the apparatus may include a second rolling member disposed on the frame part so as to be in rollable contact with the lifting device.

Since the second rolling member is disposed on the frame part as described above, the frame part may move relative to the lifting device as the second rolling member rolls. Therefore, the operator may move the frame part with a comparatively small effort. As a result, it is possible to obtain an advantageous effect of further simplifying the process of replacing the pressure vessel and improving the convenience.

According to the exemplary embodiment of the present disclosure, the apparatus may include a second accommodation portion provided in the lifting device, and configured to selectively accommodate the second rolling member so as to restrict a rolling motion of the second rolling member relative to the lifting device.

Since the second rolling member is accommodated in the second accommodation portion when the frame part is disposed at the reference mounting position as described above, it is possible to obtain an advantageous effect of inhibiting the inadvertent movement and separation of the frame part seated on the lifting device and stably maintaining the seated (arranged) state of the frame part.

According to the exemplary embodiment of the present disclosure, the apparatus may include a guide member provided in the lifting device and configured to guide a rolling motion of the first rolling member relative to the frame part.

Since the lifting device has the guide member as described above, the movement of the frame part relative to the lifting device may be stably maintained in the rectilinear direction, and the frame part may be accurately positioned at the reference mounting position.

According to the exemplary embodiment of the present disclosure, the apparatus may include a lower rolling member disposed on the first frame member so as to be in rollable contact with the second frame member.

Since the lower rolling member is disposed on the first frame member as described above, the second frame member may move on the upper surface of the first frame member as the lower rolling member rolls. Therefore, the operator may move the second frame member with a comparatively small effort. As a result, it is possible to obtain an advantageous effect of further simplifying the process of replacing the pressure vessel and improving the convenience.

According to the exemplary embodiment of the present disclosure, the apparatus may include: an upper accommodation portion disposed on the second frame member, and configured to selectively accommodate the lower rolling member so as to restrict a rolling motion of the lower rolling member relative to the second frame member.

Since the lower rolling member is accommodated in the upper accommodation portion when the second frame member is disposed at the reference mounting position as described above, it is possible to obtain an advantageous effect of inhibiting the inadvertent movement and separation of the second frame member seated on an upper portion of the first frame member and stably maintaining the seated (arranged) state of the second frame member.

According to the exemplary embodiment of the present disclosure, the apparatus may include a support bracket disposed on the first frame member and configured to support the lower rolling member so that the lower rolling member is rotatable.

According to the exemplary embodiment of the present disclosure, the apparatus may include a guide partition wall extending from the support bracket and configured to guide a rolling motion of the lower rolling member relative to the second frame member.

Since the guide partition wall is provided as described above, the movement of the second frame member relative to the first frame member may be stably maintained in the rectilinear direction, and the second frame member may be accurately positioned at the reference mounting position.

According to the exemplary embodiment of the present disclosure, the apparatus may include a partition wall member disposed on the first frame member and configured to guide a rolling motion of the lower rolling member relative to the second frame member.

As described above, the rolling motion of the lower rolling member relative to the second frame member may be guided by the dual guide structure including the partition wall member and the guide partition wall. Therefore, it is possible to obtain an advantageous effect of more stably maintaining the movement of the second frame member relative to the first frame member in the rectilinear direction.

According to the exemplary embodiment of the present disclosure, the apparatus may include an upper rolling member disposed on the second frame member so as to be in rollable contact with the first frame member.

Since the upper rolling member is disposed on the second frame member as described above, the second frame member may move on the upper surface of the first frame member as the upper rolling member rolls. Therefore, the operator may move the second frame member with a comparatively small effort. As a result, it is possible to obtain an advantageous effect of further simplifying the process of replacing the pressure vessel and improving the convenience.

According to the exemplary embodiment of the present disclosure, the apparatus may include a lower accommodation portion disposed on the first frame member, and configured to selectively accommodate the upper rolling member so as to restrict a rolling motion of the upper rolling member relative to the first frame member.

Since the upper rolling member is accommodated in the lower accommodation portion when the second frame member is disposed at the reference mounting position as described above, it is possible to obtain an advantageous effect of inhibiting the inadvertent movement and separation of the second frame member seated on the first frame member and stably maintaining the seated (arranged) state of the second frame member.

According to the exemplary embodiment of the present disclosure, the apparatus may include: a regulator disposed on the frame part; and a flexible connection member configured to connect the regulator and the pressure vessel so that the regulator and the pressure vessel communicate with each other.

As described above, according to the embodiment of the present disclosure, the regulators may be disposed on the respective frame members constituting the frame part, and the pressure vessels and the regulators may be connected by means of flexible high-pressure hoses. Therefore, the pressure vessel and the regulator may be accurately assembled even though the pressure vessel is inaccurately mounted on the frame member during the process of replacing the pressure vessel, for example. Therefore, it is possible to obtain an advantageous effect of improving the safety and reliability and minimizing a leakage of hydrogen from a tube (e.g., the flexible high-pressure hose) for connecting the pressure vessel and the regulator.

According to the exemplary embodiment of the present disclosure, the apparatus may include: a rectilinearly movable member configured to rectilinearly move relative to the subject depending on a change in length of the cylinder; and a guide link member having one end rotatably connected to the lifting table and the other end rotatably connected to the rectilinearly movable member.

According to the exemplary embodiment of the present disclosure, the apparatus may include a support member configured to support the lifting table on the subject.

Since the lifting table is supported by the support member as described above, it is possible to obtain an advantageous effect of improving the safety and reliability and further securely maintaining the arranged state of the pressure vessel seated on the lifting table.

DETAILED DESCRIPTION

Figure 1:
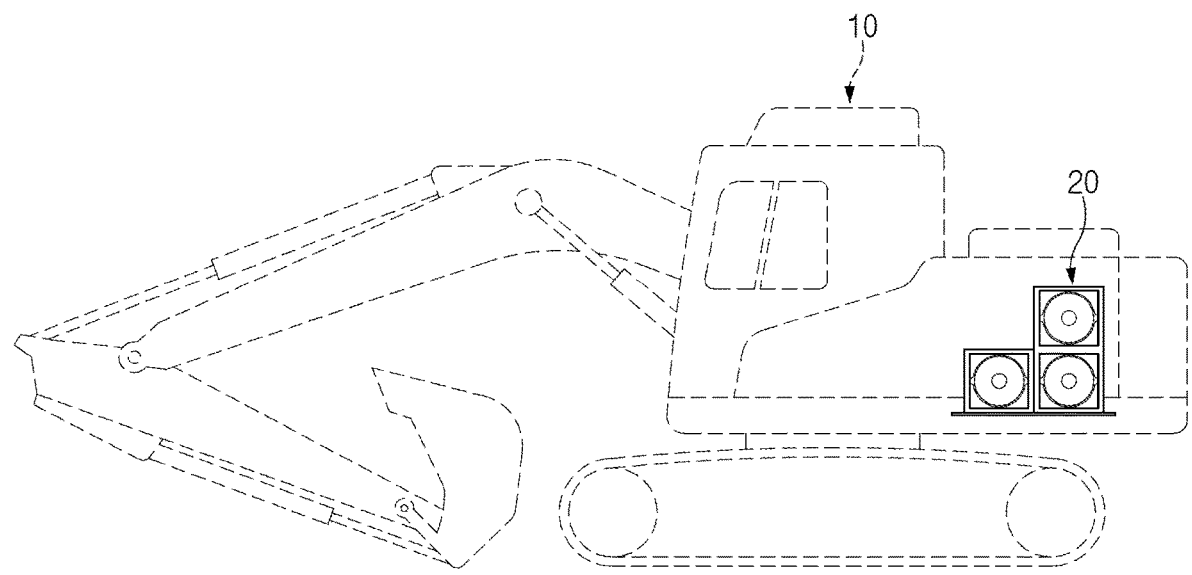
FIG. 1 is a view for explaining an application example of an apparatus for fixing a pressure vessel according to an embodiment of the present disclosure.
Figure 2:
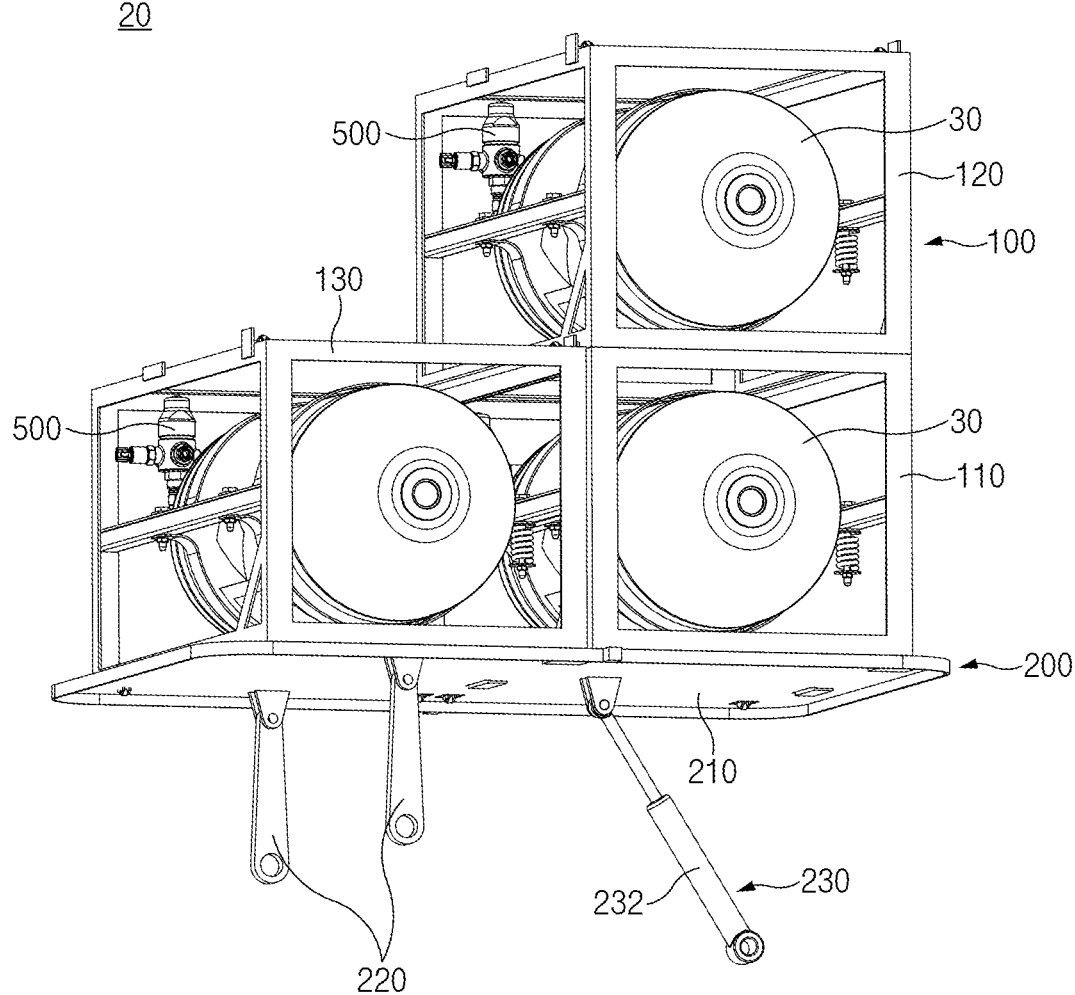
FIG. 2 is a view for explaining the apparatus for fixing a pressure vessel according to the embodiment of the present disclosure.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 16, an apparatus 20 for fixing a pressure vessel according to an embodiment of the present disclosure includes a frame part 100 disposed separably from a subject 10 and configured to support a pressure vessel 30, and a lifting device 200 configured to selectively raise or lower the frame part 100 relative to the subject 10.

For reference, the apparatus 20 for fixing a pressure vessel according to the embodiment of the present disclosure may be used to mount (fix) the pressure vessel 30 on various subjects 10. The present disclosure is not restricted or limited by the type and structure of the subject 10 to which the pressure vessel 30 is fixed.

In particular, the apparatus 20 for fixing a pressure vessel according to the embodiment of the present disclosure may be used to mount the pressure vessel 30 on a construction machine such as an excavator.

The pressure vessel 30 may store high-pressure compressed hydrogen therein. For example, the pressure vessel 30 may include a liner (not illustrated), a carbon fiber layer (not illustrated) configured to surround an outer surface of the liner, and a fiberglass layer (not illustrated) configured to surround an outer surface of the carbon fiber layer. The pressure vessel 30 may be selectively expanded or contracted depending on a pressure of hydrogen stored in the pressure vessel 30.

The frame part 100 serves to support the pressure vessel 30 on the subject 10.

The frame part 100 may have various structures capable of supporting the pressure vessel 30 on the subject 10. The present disclosure is not restricted or limited by the structure of the frame part 100.

For example, the frame part 100 may include a plurality of frame members individually and separably provided, and the pressure vessels 30 may be respectively supported on the frame members.

Hereinafter, an example will be described in which the frame part 100 includes a first frame member 110, a second frame member 120, and a third frame member, which are individually and separably provided, the second frame member 120 is stacked on an upper portion of the first frame member 110 in an upward/downward direction, and the third frame member is disposed at a lateral side of the first frame member 110. In some instances, all the first frame member 110, the second frame member 120, and the third frame member may be stacked in the upward/downward direction.

According to another embodiment of the present disclosure, the frame part 100 may include a single frame member or four or more frame members.

According to the exemplary embodiment of the present disclosure, the first frame member 110, the second frame member 120, and the third frame member may surround the pressure vessels 30 to protect the pressure vessels 30.

For example, the first frame member 110, the second frame member 120, and the third frame member may each have an opened quadrangular casing structure opened in all directions. The pressure vessel 30 may be accommodated in each of the first frame member 110, the second frame member 120, and the third frame member.

According to the exemplary embodiment of the present disclosure, the apparatus 20 for fixing a pressure vessel may include clamp members 150 configured to fix the pressure vessel 30 to the frame part 100.

According to the exemplary embodiment of the present disclosure, the clamp members 150 configured to fix the pressure vessels 30 may be respectively disposed on the first frame member 110, the second frame member 120, and the third frame member.

The clamp member 150 may have various structures capable of fixing the pressure vessel 30 to the frame part 100

(e.g., the first frame member). The present disclosure is not restricted or limited by the structure of the clamp member 150.

For example, the clamp member 150 may include a first clamp body (not illustrated) configured to surround a part of an outer peripheral surface of the pressure vessel 30, a second clamp body (not illustrated) configured to surround another part of the outer peripheral surface of the pressure vessel 30, and a fastening member (not illustrated) configured to fasten the first clamp body and the second clamp body.

For example, the first and second clamp bodies may each be made by bending a band-shaped member made of a metallic material in an approximately semicircular shape.

The lifting device 200 serves to selectively raise or lower the frame part 100 in the upward/downward direction relative to the subject 10.

In particular, the lifting device 200 may selectively raise or lower the frame part 100 between a first position (see FIG. 4) with a first height H1 and a second position (see FIG. 5) with a second height H2 lower than the first height H1.

For reference, a height difference between the first position (with the first height) and the second position (with the second height) may be variously changed in accordance with required conditions and design specifications. The present disclosure is not restricted or limited by the height difference between the first position (with the first height) and the second position (with the second height).

The lifting device 200 may have various structures capable of selectively raising or lowering the frame part 100 in accordance with required conditions and design specifications. The present disclosure is not restricted or limited by the structure of the lifting device 200.

Figure 6:
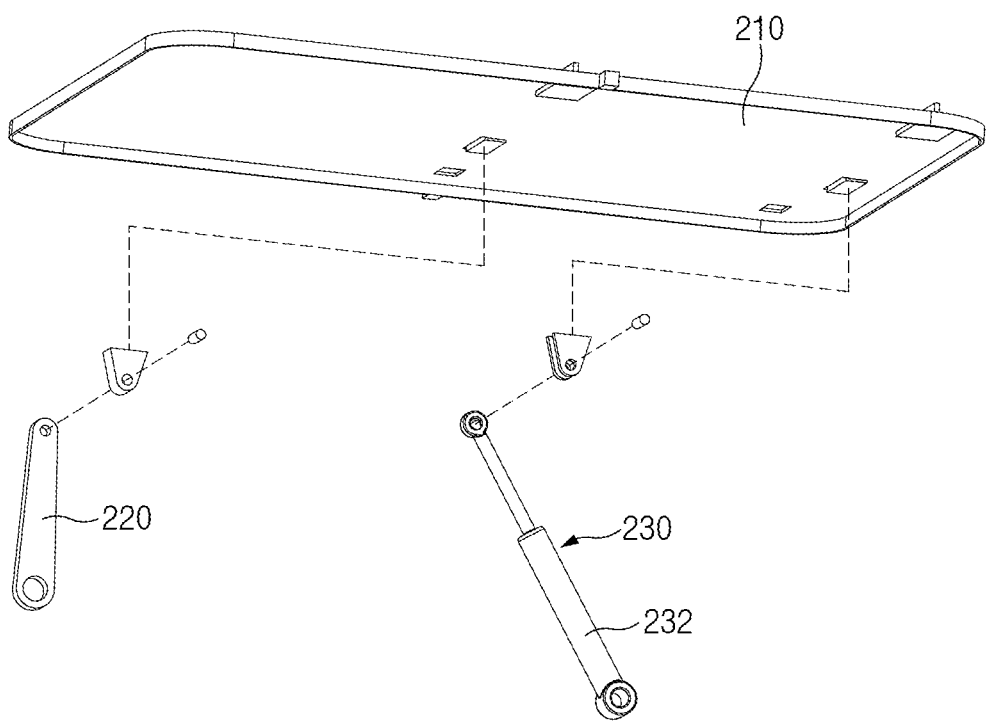
FIG. 6 is a view for explaining a lifting device of the apparatus for fixing a pressure vessel according to the embodiment of the present disclosure.

Referring to FIG. 6, according to the exemplary embodiment of the present disclosure, the lifting device 200 may include a lifting table 210 on which the frame part 100 is seated, a connection link member 220 having one end rotatably connected to the lifting table 210 and the other end rotatably connected to the subject 10, and a stretchable part 230 selectively stretchable and configured to connect the lifting table 210 and the subject 10. The lifting table 210 may be raised or lowered between the first position and the second position depending on a change in length of the stretchable part 230.

The lifting table 210 may have various structures on which the frame part 100 may be seated. For example, the lifting table 210 may be provided in the form of an approximately quadrangular plate. According to another embodiment of the present disclosure, the lifting table 210 may have a circular plate shape or other structures.

The connection link member 220 may have various structures that enables the lifting table 210 to be rotatably connected to the subject 10.

For example, the connection link member 220 may be provided in the form of a link arm having a predetermined length. One end (an upper end based on FIG. 2) of the connection link member 220 may be rotatably connected to the lifting table 210, and the other end (a lower end based on FIG. 2) of the connection link member 220 may be rotatably connected to the subject 10 (e.g., a chassis of a construction machine). The connection link member 220 rotates about the other end of the connection link member 220 relative to the subject 10, such that a height of the lifting table 210 may be selectively adjusted.

The connection link member 220 may be variously changed in number and position in accordance with required conditions and design specifications. For example, referring to FIG. 2, the two connection link members 220 may be disposed on a straight line and connected to a lower surface of the lifting table 210.

Figure 15:
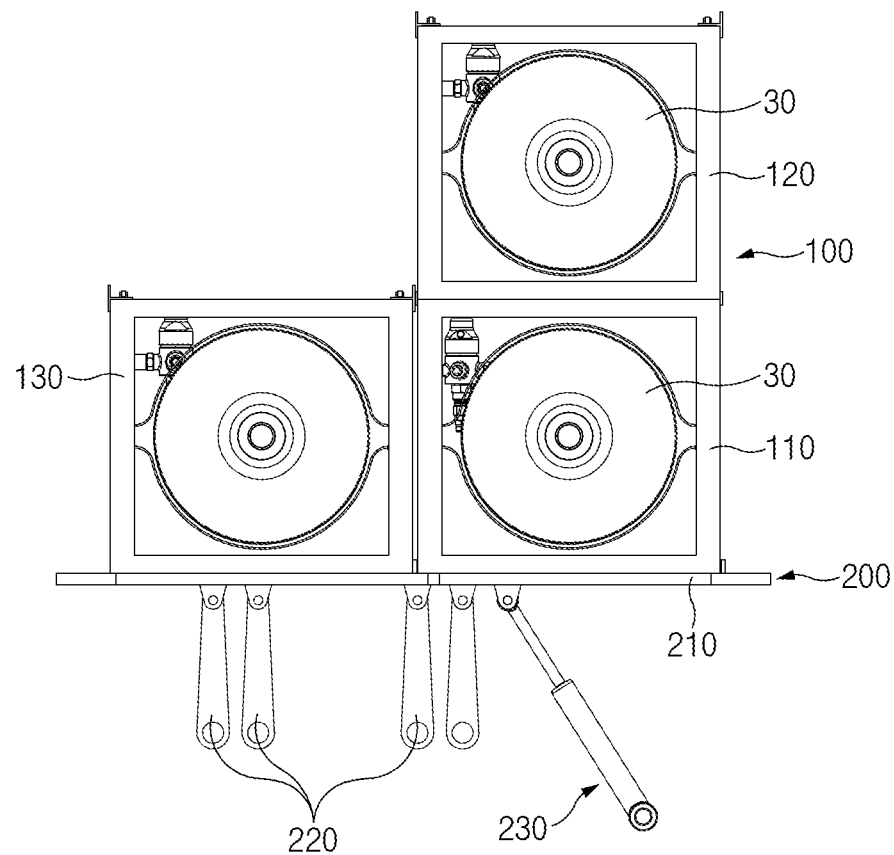

According to another embodiment of the present disclosure, as illustrated in FIG. 15, a plurality of (e.g., four) connection link members 220 may be spaced apart from one another.

The stretchable part 230 connects the lifting table 210 and the subject 10 and is selectively stretchable.

The stretchable part 230 rotates the connection link member 220 by being stretched or compressed (in a longitudinal direction thereof) in the state in which the stretchable part 230 connects the lifting table 210 and the subject 10, such that the height of the lifting table 210 may be adjusted.

Various stretchable means, which may be stretched or compressed in the longitudinal direction thereof, may be used as the stretchable part 230. The present disclosure is not restricted or limited by the type and structure of the stretchable part 230.

According to the exemplary embodiment of the present disclosure, the stretchable part 230 may include a cylinder 232 having one end connected to the lifting table 210 and the other end connected to the subject 10, the cylinder 232 having a selectively variable length.

For example, a hydraulic cylinder having a length that varies as a piston (not illustrated) is moved by a hydraulic pressure generated by a hydraulic pump provided in the subject 10 (the construction machine) may be used as the cylinder 232. According to another embodiment of the present disclosure, an electric cylinder may be used as the stretchable part 230.

In the embodiment of the present disclosure illustrated and described above, the example has been described in which the stretchable part 230 includes only the single cylinder 232. However, according to another embodiment of the present disclosure, the stretchable part 230 may include two or more cylinders 232. The present disclosure is not restricted or limited by the number of cylinders 232 and the arrangement and structures of the cylinders 232.

Figure 4:
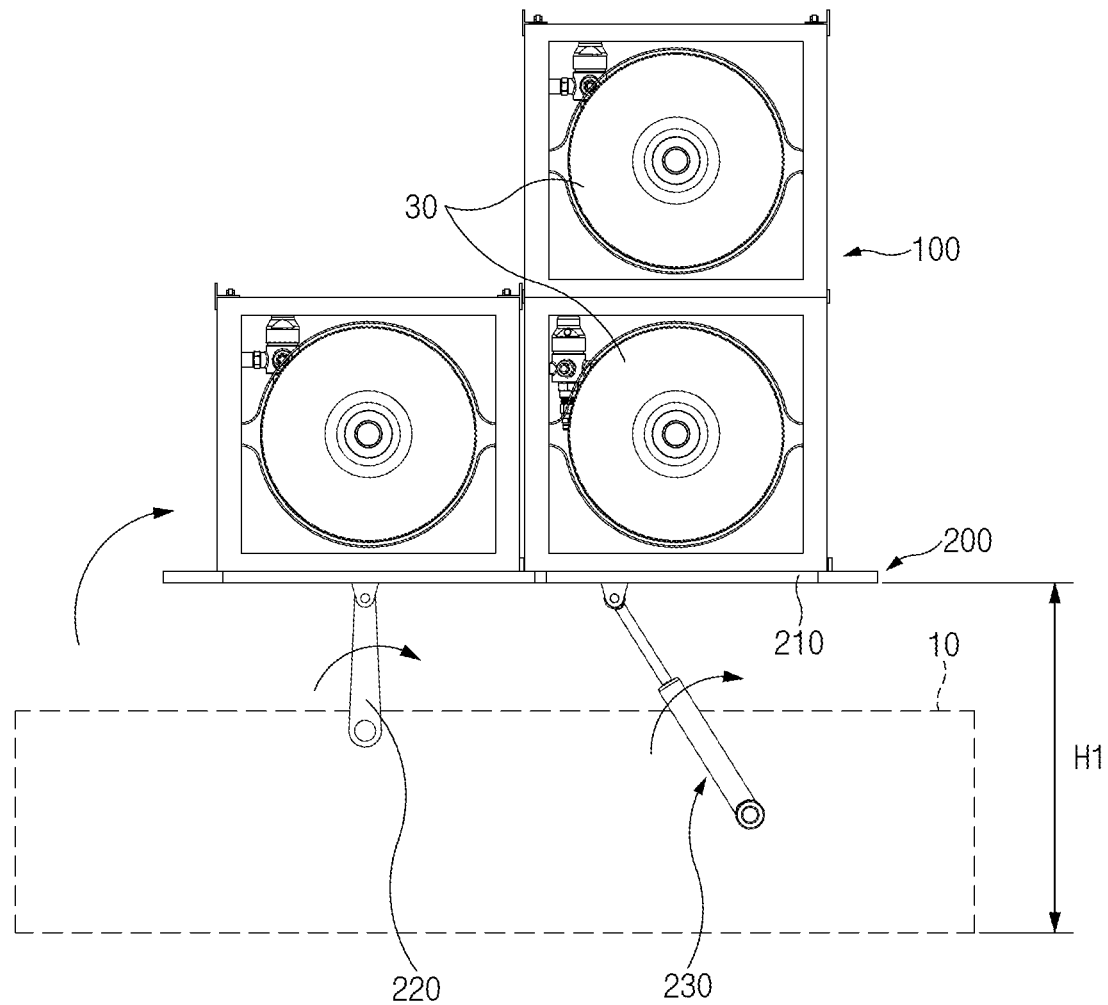
FIG. 4 is a view for explaining a state in which a frame part of the apparatus for fixing a pressure vessel according to the embodiment of the present disclosure is raised.

Referring to FIG. 4, for example, during the normal operation of the construction machine, as the length of the cylinder 232 decreases, the connection link member 220 and the cylinder 232 rotate clockwise, and the lifting table 210 moves in a rightward and upward direction, such that the pressure vessel 30 may be disposed at the first height H1 (the first position).

Figure 5:
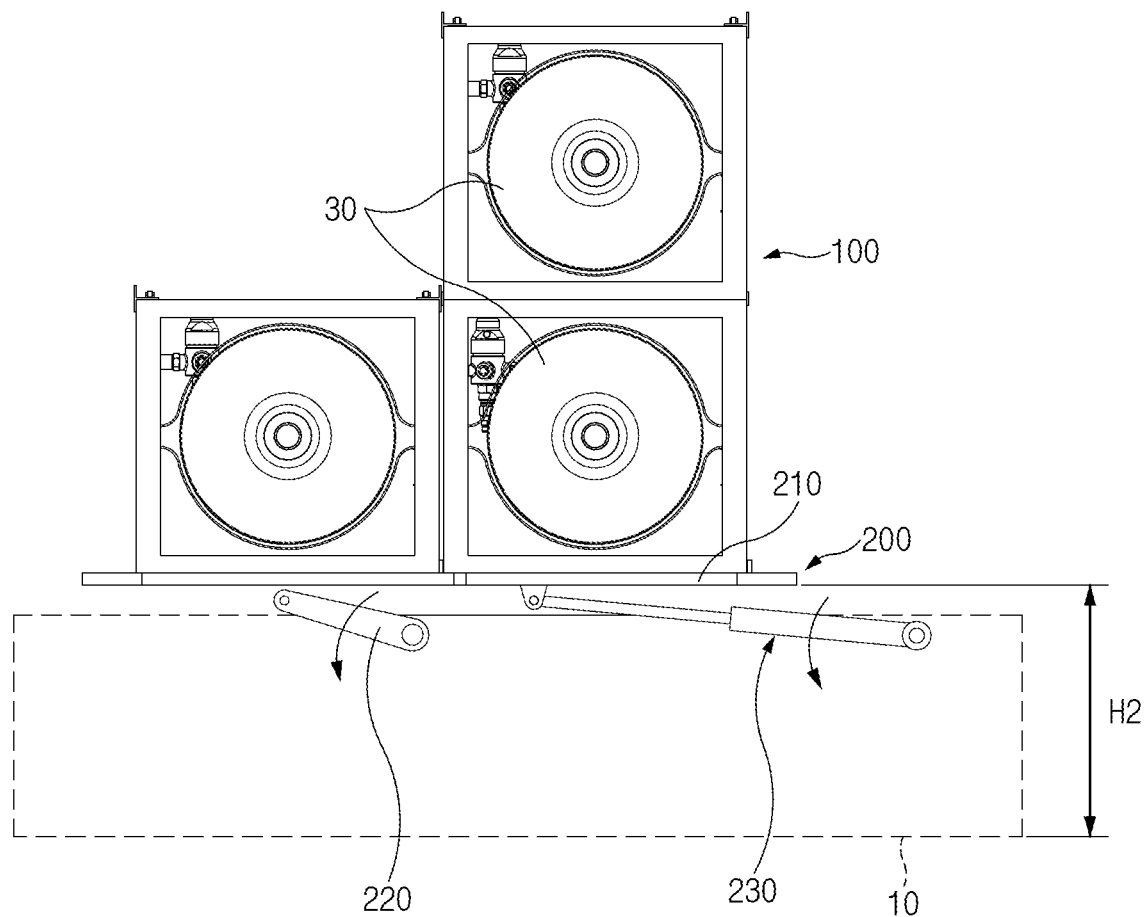
FIG. 5 is a view for explaining a state in which the frame part of the apparatus for fixing a pressure vessel according to the embodiment of the present disclosure is lowered.

In contrast, referring to FIG. 5, for example, during the process of replacing the pressure vessel 30, as the length of the cylinder 232 increases, the connection link member 220 and the cylinder 232 rotate counterclockwise, and the lifting table 210 moves in a leftward and downward direction, such that the pressure vessel 30 may be disposed at the second height H2 (the second position) lower than the first height.

Figure 7:
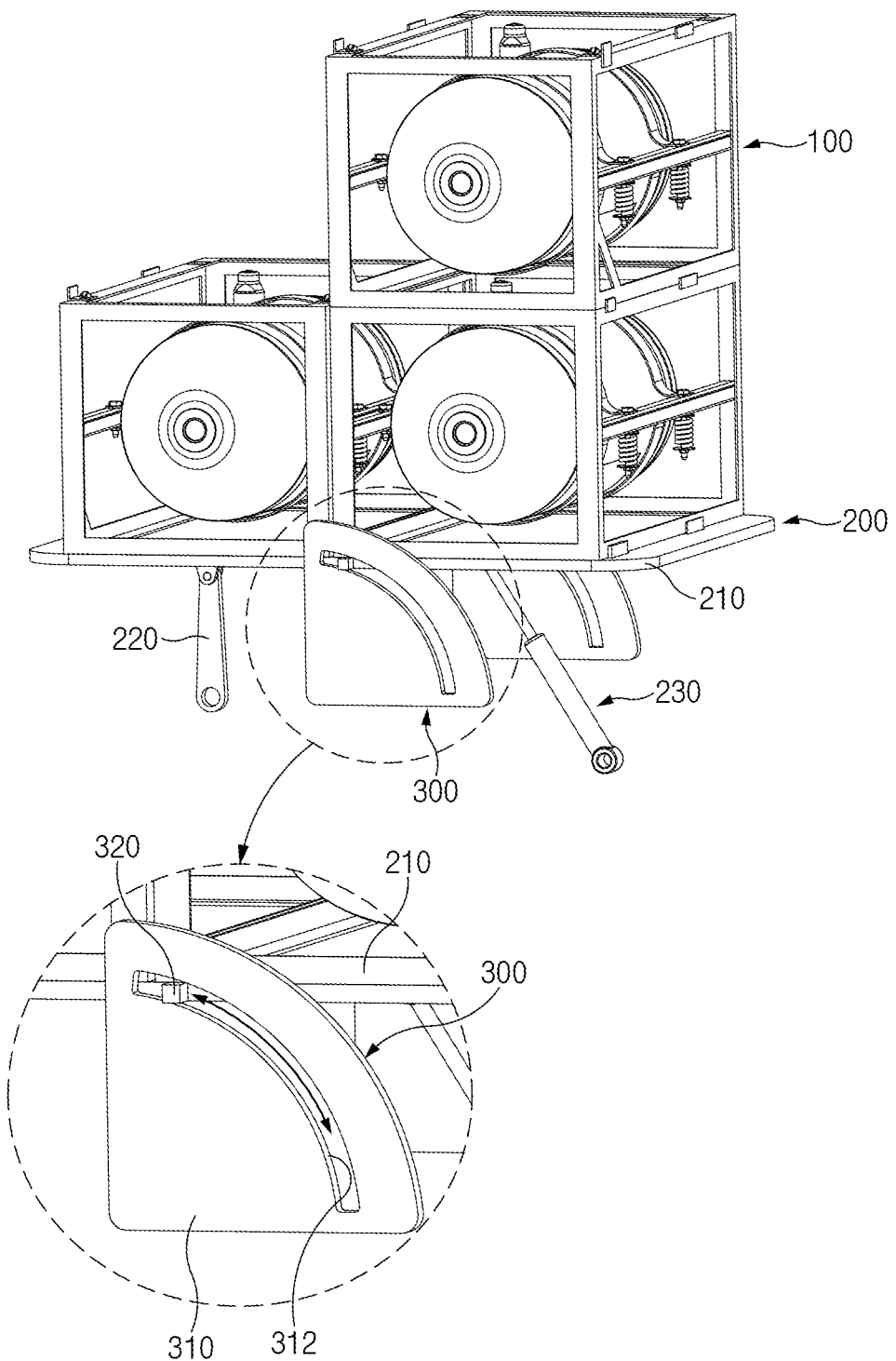
FIG. 7 is a view for explaining a lifting guide part of the apparatus for fixing a pressure vessel according to the embodiment of the present disclosure.

Referring to FIG. 7, according to the exemplary embodiment of the present disclosure, the apparatus 20 for fixing a pressure vessel may include a lifting guide part 300 configured to guide the raising or lowering of the frame part 100 relative to the subject 10.

The lifting guide part 300 may have various structures capable of guiding the raising or lowering of the frame part 100 relative to the subject 10.

For example, the lifting guide part 300 may include a lifting guide member 310 disposed on the subject 10 and having a guide slot 312, and a guide protrusion 320 disposed on the frame part 100 and accommodated in the guide slot 312 so as to be movable along the guide slot 312.

In particular, the lifting guide parts 300 may be respectively disposed on one surface and the other surface of the lifting table 210.

For example, the lifting guide member 310 may have the guide slot 312 having an approximately circular arc shape along the lifting route (lifting trajectory) of the frame part 100. The guide protrusion 320 configured to move along the guide slot 312 may be integrated with a lateral end of the lifting table 210.

As described above, according to the exemplary embodiment of the present disclosure, the lifting guide part 300 may guide the raising or lowering of the frame part 100 relative to the subject 10. Therefore, it is possible to obtain an advantageous effect of minimizing vibration and swaying of the frame part 100 (the pressure vessel) and inhibiting the frame part 100 from separating from a predetermined lifting route when the frame part 100 is raised or lowered.

Figure 8:
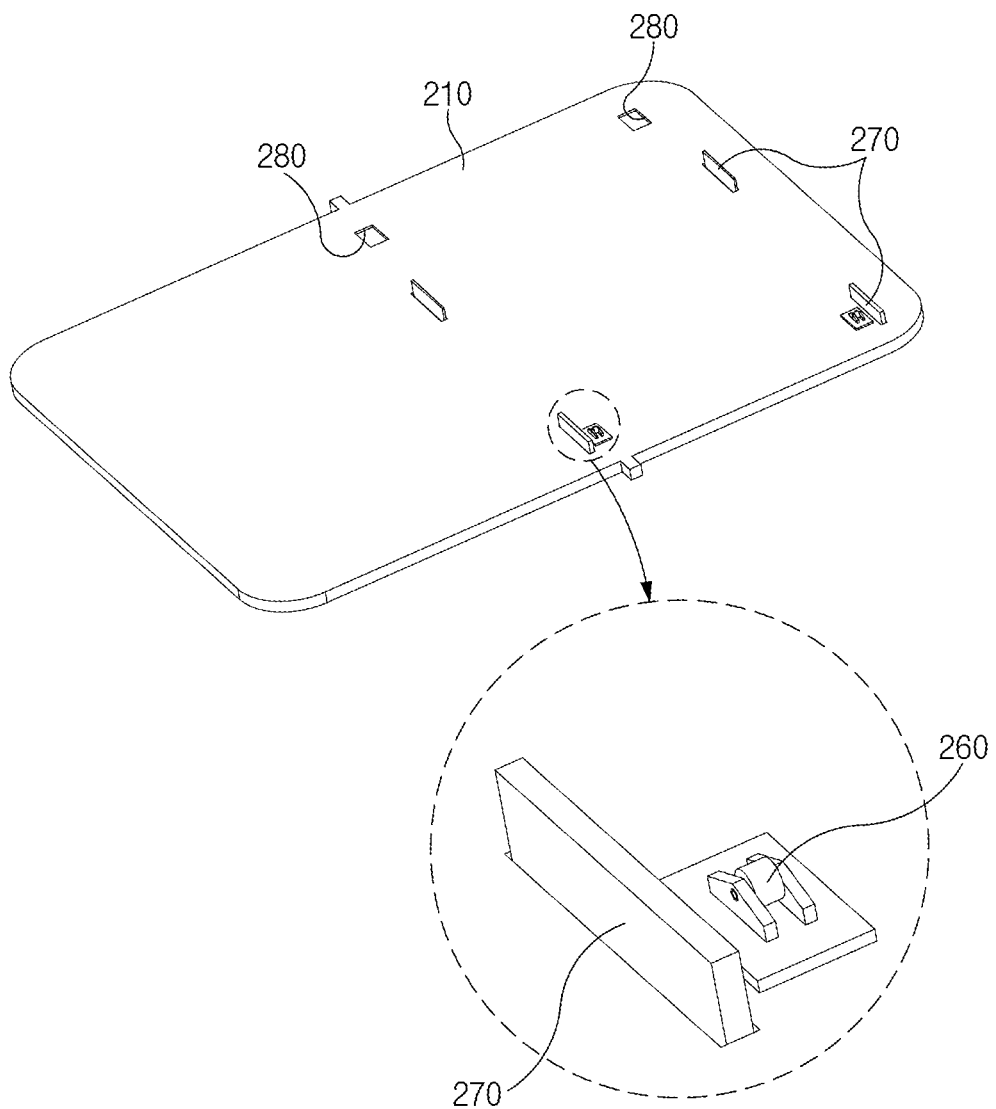
FIGS. 8 to 10 are views for explaining a first rolling member and a second rolling member of the apparatus for fixing a pressure vessel according to the embodiment of the present disclosure.
Figure 9:
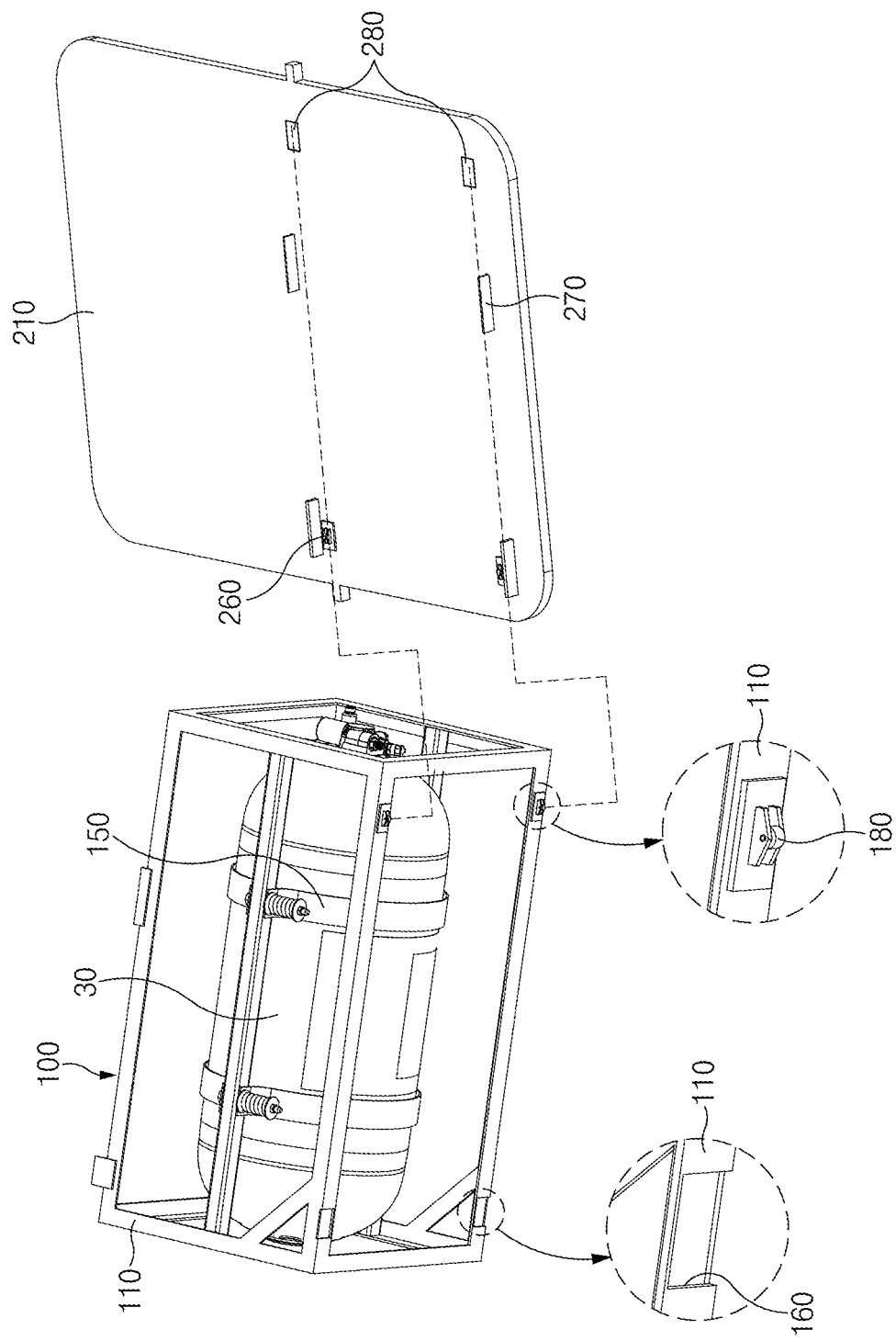
Figure 10:
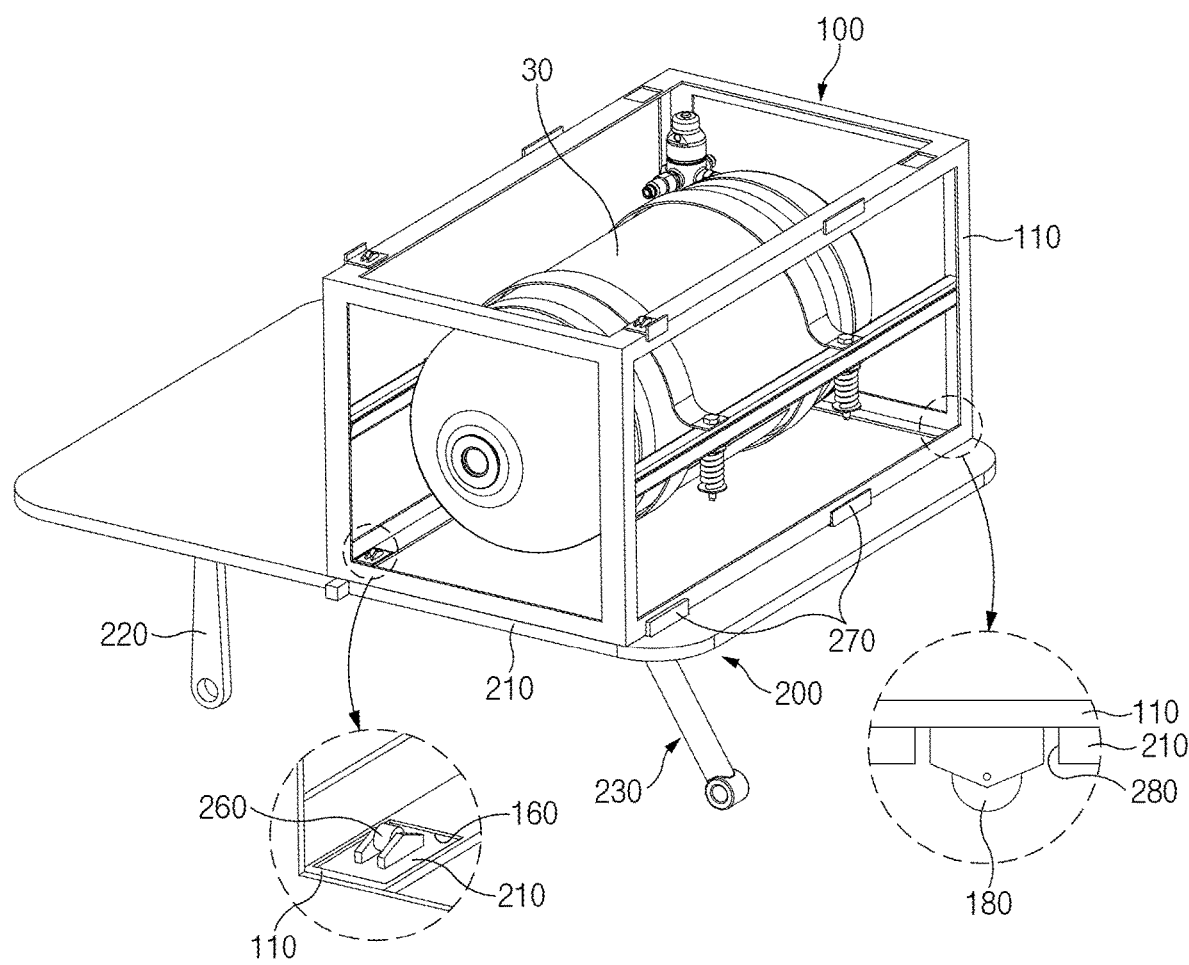

Referring to FIGS. 8 to 10, according to the exemplary embodiment of the present disclosure, the apparatus 20 for fixing a pressure vessel may include first rolling members 260 provided in the lifting device 200 so as to be in rollable contact with the frame part 100.

For example, the first rolling member 260 may be disposed on an upper surface of the lifting table 210, and the first rolling member 260 may be in rollable contact with a lower surface of the first frame member 110 seated on an upper surface of the lifting table 210.

A typical roller or ball capable of being in rollable contact with the frame part 100 may be used as the first rolling member 260. The present disclosure is not restricted or limited by the type and structure of the first rolling member 260.

Since the first rolling member 260 is disposed on the upper surface of the lifting table 210 as described above, the first frame member 110 may move on the upper surface of the lifting table 210 as the first rolling member 260 rolls. Therefore, an operator may move (push or pull) the first frame member 110 with a comparatively small effort. As a result, it is possible to obtain an advantageous effect of further simplifying the process of replacing the pressure vessel 30 and improving the convenience.

In addition, according to the exemplary embodiment of the present disclosure, the apparatus 20 for fixing a pressure vessel may include first accommodation portions 160 provided in the frame part 100 and configured to selectively accommodate the first rolling members 260, respectively. When the first rolling member 260 is accommodated in the first accommodation portion 160, the rolling motion of the first rolling member 260 relative to the frame part 100 may be restricted.

For example, the first accommodation portion 160 may be disposed on the first frame member 110 and provided in the form of a hole or groove capable of accommodating the first rolling member 260. The present disclosure is not restricted or limited by the structure and shape of the first accommodation portion 160.

In particular, the first rolling member 260 may be accommodated in the first accommodation portion 160 only when the first frame member 110 is disposed at a preset reference mounting position on the lifting table 210.

Since the first rolling member 260 is accommodated in the first accommodation portion 160 when the first frame member 110 is disposed at the reference mounting position as described above, it is possible to obtain an advantageous effect of inhibiting the inadvertent movement and separation of the first frame member 110 seated on the lifting table 210 and stably maintaining the seated (arranged) state of the first frame member 110.

Referring to FIGS. 8 to 10, according to the embodiment of the present disclosure, the apparatus 20 for fixing a pressure vessel may include second rolling members 180 provided in the frame part 100 (e.g., disposed on the lower surface of the first frame member) so as to be in rollable contact with the lifting device 200.

A typical roller or ball capable of being in rollable contact with the lifting device 200 (e.g., the lifting table) may be used as the second rolling member 180. The present disclosure is not restricted or limited by the type and structure of the second rolling member 180.

Since the second rolling member 180 is disposed on the lower surface of the first frame member 110 as described above, the first frame member 110 may move on the upper surface of the lifting table 210 as the second rolling member 180 rolls. Therefore, the operator may move (push or pull) the first frame member 110 with a comparatively small effort. As a result, it is possible to obtain an advantageous effect of further simplifying the process of replacing the pressure vessel 30 and improving the convenience.

In addition, according to the embodiment of the present disclosure, the apparatus 20 for fixing a pressure vessel may include second accommodation portions 280 provided in the lifting device 200 (e.g., disposed on the lifting table) and configured to selectively accommodate the second rolling members 180, respectively. When the second rolling member 180 is accommodated in the second accommodation portion 280, the rolling motion of the second rolling member 180 relative to the lifting device 200 may be restricted.

For example, the second accommodation portion 280 may be disposed on the lifting table 210 and provided in the form of a hole or groove capable of accommodating the second rolling member 180. The present disclosure is not restricted or limited by the structure and shape of the second accommodation portion 280.

In particular, the second rolling member 180 may be accommodated in the second accommodation portion 280 only when the first frame member 110 is disposed at a preset reference mounting position on the lifting table 210.

Since the second rolling member 180 is accommodated in the second accommodation portion 280 when the first frame member 110 is disposed at the reference mounting position as described above, it is possible to obtain an advantageous effect of inhibiting the inadvertent movement and separation of the first frame member 110 seated on the lifting table 210 and stably maintaining the seated (arranged) state of the first frame member 110.

More particularly, the first rolling member 260 and the first accommodation portion 160 may be disposed adjacent to one end of the lifting table 210 (corresponding to one end of the first frame member 110). The second rolling member 180 and the second accommodation portion 280 may be disposed adjacent to the other end of the lifting table 210 (corresponding to the other end of the first frame member 110).

In addition, referring to FIGS. 8 to 10, according to the exemplary embodiment of the present disclosure, the apparatus 20 for fixing a pressure vessel may include guide members 270 provided in the lifting device 200 and configured to guide the rolling motion of the first rolling member 260 relative to the frame part 100.

For example, the guide member 270 may serve to guide the rolling motion of the first rolling member 260 relative to the first frame member 110 (the rectilinear movement of the first frame member relative to the lifting table).

The guide member 270 may have various structures capable of guiding the rolling motion of the first rolling member 260 relative to the first frame member 110. The present disclosure is not restricted or limited by the structure of the guide member 270.

According to the exemplary embodiment of the present disclosure, the guide members 270 may be disposed to partially cover two opposite lateral ends of the frame part 100 (e.g., the first frame member). The frame part 100 may move along a rectilinear route defined by the pair of guide members 270.

Since the guide members 270 are disposed on the lifting table 210 as described above, the movement of the first frame member 110 relative to the lifting table 210 may be stably maintained in the rectilinear direction, and the first frame member 110 may be accurately positioned at the reference mounting position.

In the embodiment of the present disclosure illustrated and described above, the example has been described in which the frame part 100 (e.g., the first frame member) moves relative to the lifting device 200 (e.g., the lifting table). However, according to another exemplary embodiment of the present disclosure, the plurality of frame members (e.g., the first frame member and the second frame member) constituting the frame part 100 may move relative to one another.

Figure 11:
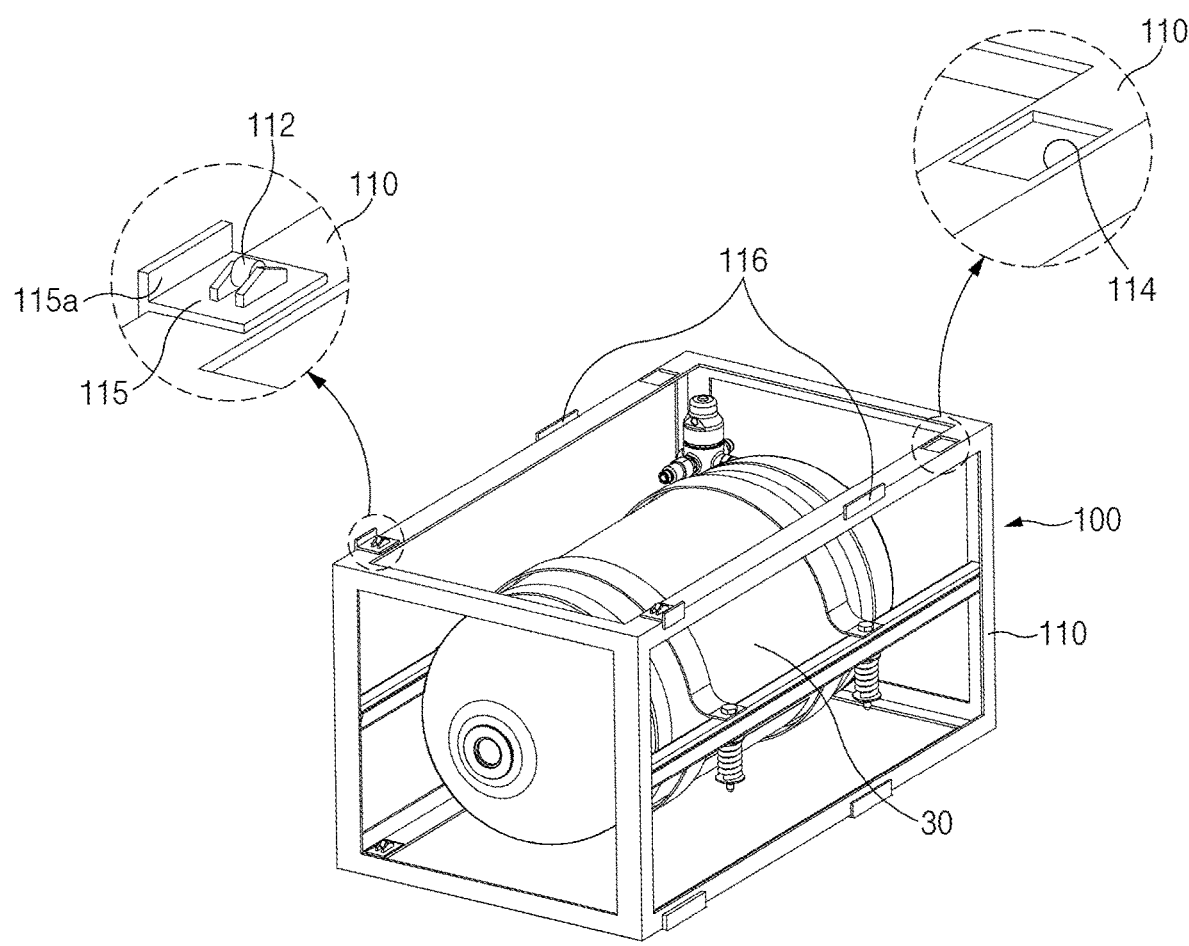
FIG. 11 is a view for explaining a first frame member of the apparatus for fixing a pressure vessel according to the embodiment of the present disclosure.
Figure 12:
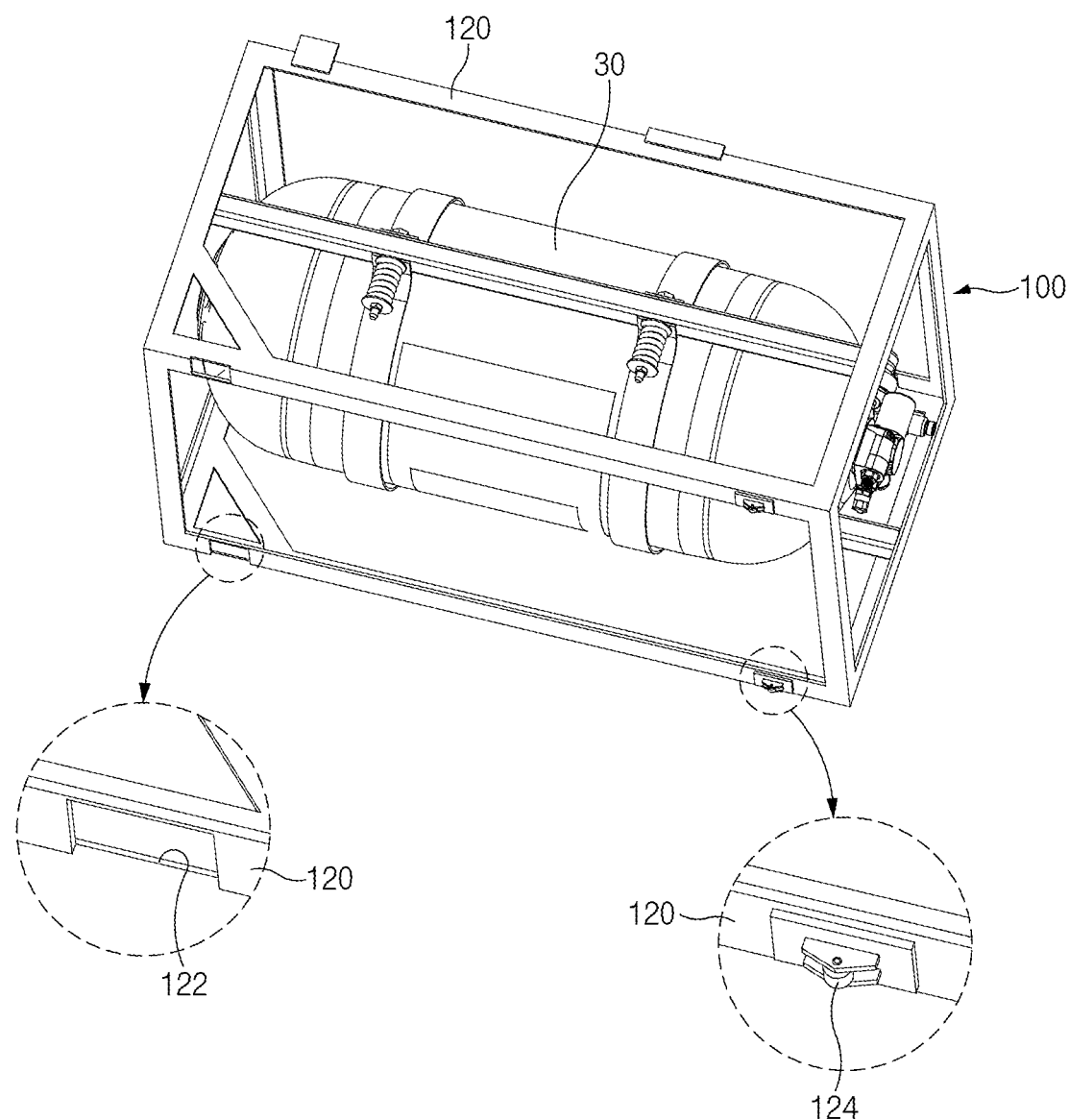
FIG. 12 is a view for explaining a second frame member of the apparatus for fixing a pressure vessel according to the embodiment of the present disclosure.
Figure 13:
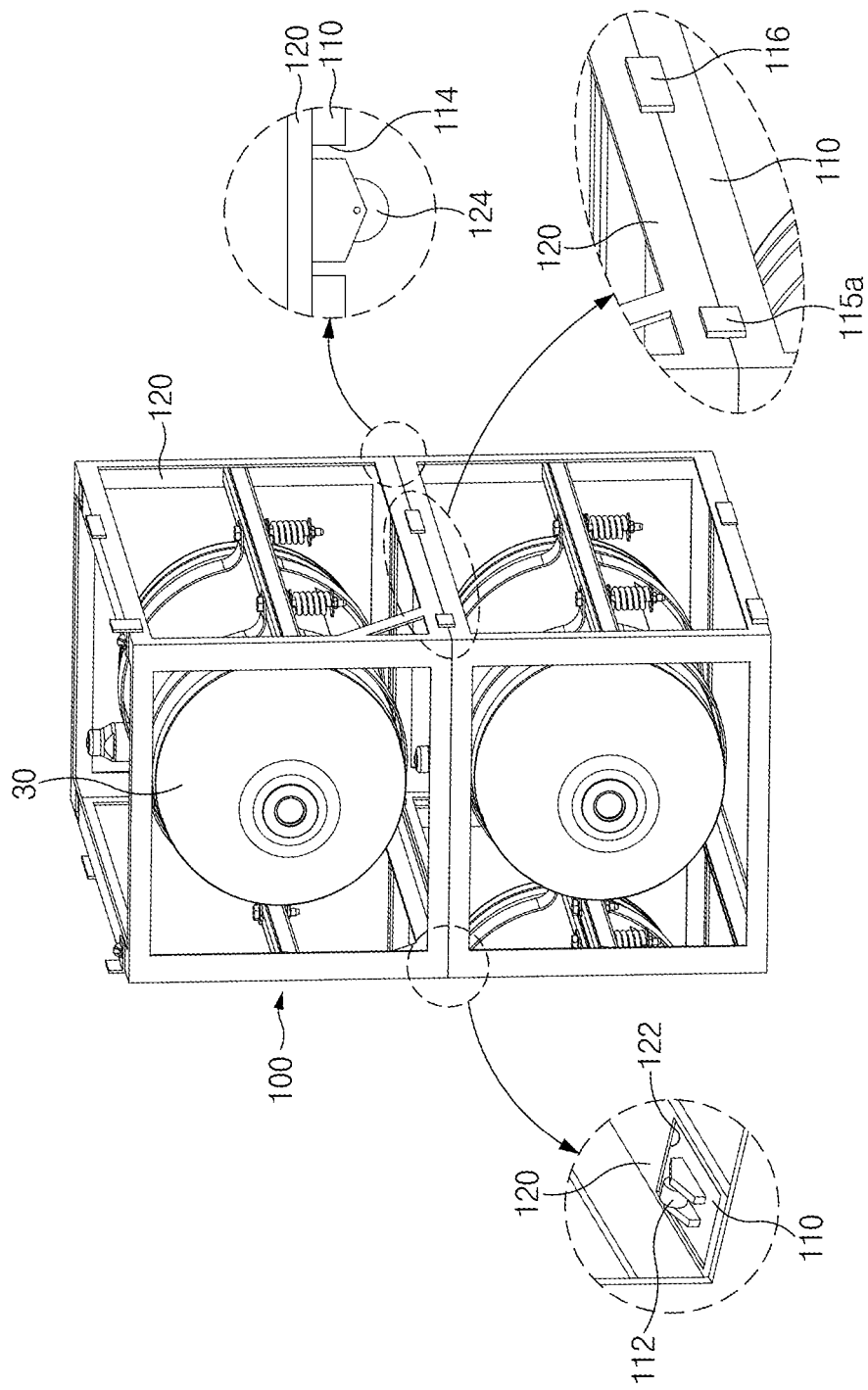
FIG. 13 is a view for explaining a state in which the first frame member and the second frame member of the apparatus for fixing a pressure vessel according to the embodiment of the present disclosure are stacked.

Referring to FIGS. 11 to 13, according to the exemplary embodiment of the present disclosure, the apparatus 20 for fixing a pressure vessel may include lower rolling members 112 disposed on the first frame member 110 (e.g., an upper surface of the first frame member) so as to be in rollable contact with the second frame member 120.

A typical roller or ball capable of being in rollable contact with the second frame member 120 may be used as the lower rolling member 112. The present disclosure is not restricted or limited by the type and structure of the lower rolling member 112.

Since the lower rolling member 112 is disposed on the upper surface of the first frame member 110 as described above, the second frame member 120 may move on the upper surface of the first frame member 110 as the lower rolling member 112 rolls. Therefore, the operator may move (push or pull) the second frame member 120 with a comparatively small effort. As a result, it is possible to obtain an advantageous effect of further simplifying the process of replacing the pressure vessel 30 and improving the convenience.

In addition, according to the embodiment of the present disclosure, the apparatus 20 for fixing a pressure vessel may include upper accommodation portions 122 disposed on the second frame member 120 and configured to selectively accommodate the lower rolling members 112, respectively. When the lower rolling member 112 is accommodated in the upper accommodation portion 122, the rolling motion of the lower rolling member 112 relative to the second frame member 120 may be restricted.

For example, the upper accommodation portion 122 may be disposed on a lower surface of the second frame member 120 and provided in the form of a hole or groove capable of accommodating the lower rolling member 112. The present disclosure is not restricted or limited by the structure and shape of the upper accommodation portion 122.

In particular, the lower rolling member 112 may be accommodated in the upper accommodation portion 122 only when the second frame member 120 is disposed at a preset reference mounting position on the first frame member 110.

Since the lower rolling member 112 is accommodated in the upper accommodation portion 122 when the second frame member 120 is disposed at the reference mounting position as described above, it is possible to obtain an advantageous effect of inhibiting the inadvertent movement and separation of the second frame member 120 seated on an upper portion of the first frame member 110 and stably maintaining the seated (arranged) state of the second frame member 120.

According to the exemplary embodiment of the present disclosure, the apparatus 20 for fixing a pressure vessel may include support brackets 115 disposed on the first frame member 110 and configured to respectively support the lower rolling members 112 so that the lower rolling members 112 are rotatable.

According to another embodiment of the present disclosure, the lower rolling member 112 may be mounted directly on the first frame member 110 without a separate support bracket.

In particular, the apparatus 20 for fixing a pressure vessel may include guide partition walls 115a extending from the support brackets 115 and configured to guide the rolling motion of the lower rolling member 112 relative to the second frame member 120.

The guide partition wall 115a may have various structures capable of guiding the rolling motion of the lower rolling member 112 relative to the second frame member 120. The present disclosure is not restricted or limited by the structure of the guide partition wall 115a.

According to the exemplary embodiment of the present disclosure, the guide partition walls 115a may serve to partially cover two opposite lateral sides of the second frame member 120, and the second frame member 120 may move along the rectilinear route defined by the pair of guide partition walls 115a.

Since the guide partition walls 115a are disposed on the first frame member 110 (the support bracket mounted on the first frame member) as described above, the movement of the second frame member 120 relative to the first frame member 110 may be stably maintained in the rectilinear direction, and the second frame member 120 may be accurately positioned at the reference mounting position.

According to the exemplary embodiment of the present disclosure, the apparatus 20 for fixing a pressure vessel may include partition wall members 116 disposed on the first frame member 110 and configured to guide the rolling motion of the lower rolling member 112 relative to the second frame member 120.

For example, the partition wall member 116 may be disposed on the first frame member 110 and spaced apart from the guide partition wall 115a. The partition wall member 116 and the guide partition wall 115a may collectively guide the rolling motion of the lower rolling member 112 relative to the second frame member 120.

As described above, the rolling motion of the lower rolling member 112 relative to the second frame member 120 may be guided by the dual guide structure including the partition wall member 116 and the guide partition wall 115a. Therefore, it is possible to obtain an advantageous effect of more stably maintaining the movement of the second frame member 120 relative to the first frame member 110 in the rectilinear direction.

Referring to FIGS. 11 to 13, according to the exemplary embodiment of the present disclosure, the apparatus 20 for fixing a pressure vessel may include upper rolling members 124 disposed on the second frame member 120 so as to be in rollable contact with the first frame member 110.

A typical roller or ball capable of being in rollable contact with the first frame member 110 may be used as the upper rolling member 124. The present disclosure is not restricted or limited by the type and structure of the upper rolling member 124.

Since the upper rolling member 124 is disposed on the lower surface of the second frame member 120 as described above, the second frame member 120 may move on the upper surface of the first frame member 110 as the upper rolling member 124 rolls. Therefore, the operator may move (push or pull) the second frame member 120 with a comparatively small effort. As a result, it is possible to obtain an advantageous effect of further simplifying the process of replacing the pressure vessel 30 and improving the convenience.

In addition, according to the embodiment of the present disclosure, the apparatus 20 for fixing a pressure vessel may include lower accommodation portions 114 disposed on the first frame member 110 and configured to selectively accommodate the upper rolling members 124, respectively. When the upper rolling member 124 is accommodated in the lower accommodation portion 114, the rolling motion of the upper rolling member 124 relative to the first frame member 110 may be restricted.

For example, the lower accommodation portion 114 may be disposed on the lifting table 210 and provided in the form of a hole or groove capable of accommodating the upper rolling member 124. The present disclosure is not restricted or limited by the structure and shape of the lower accommodation portion 114.

In particular, the upper rolling member 124 may be accommodated in the lower accommodation portion 114 only when the second frame member 120 is disposed at the preset reference mounting position on the upper surface of the first frame member 110.

Since the upper rolling member 124 is accommodated in the lower accommodation portion 114 when the second frame member 120 is disposed at the reference mounting position as described above, it is possible to obtain an advantageous effect of inhibiting the inadvertent movement and separation of the second frame member 120 seated on the first frame member 110 and stably maintaining the seated (arranged) state of the second frame member 120.

Figure 3:
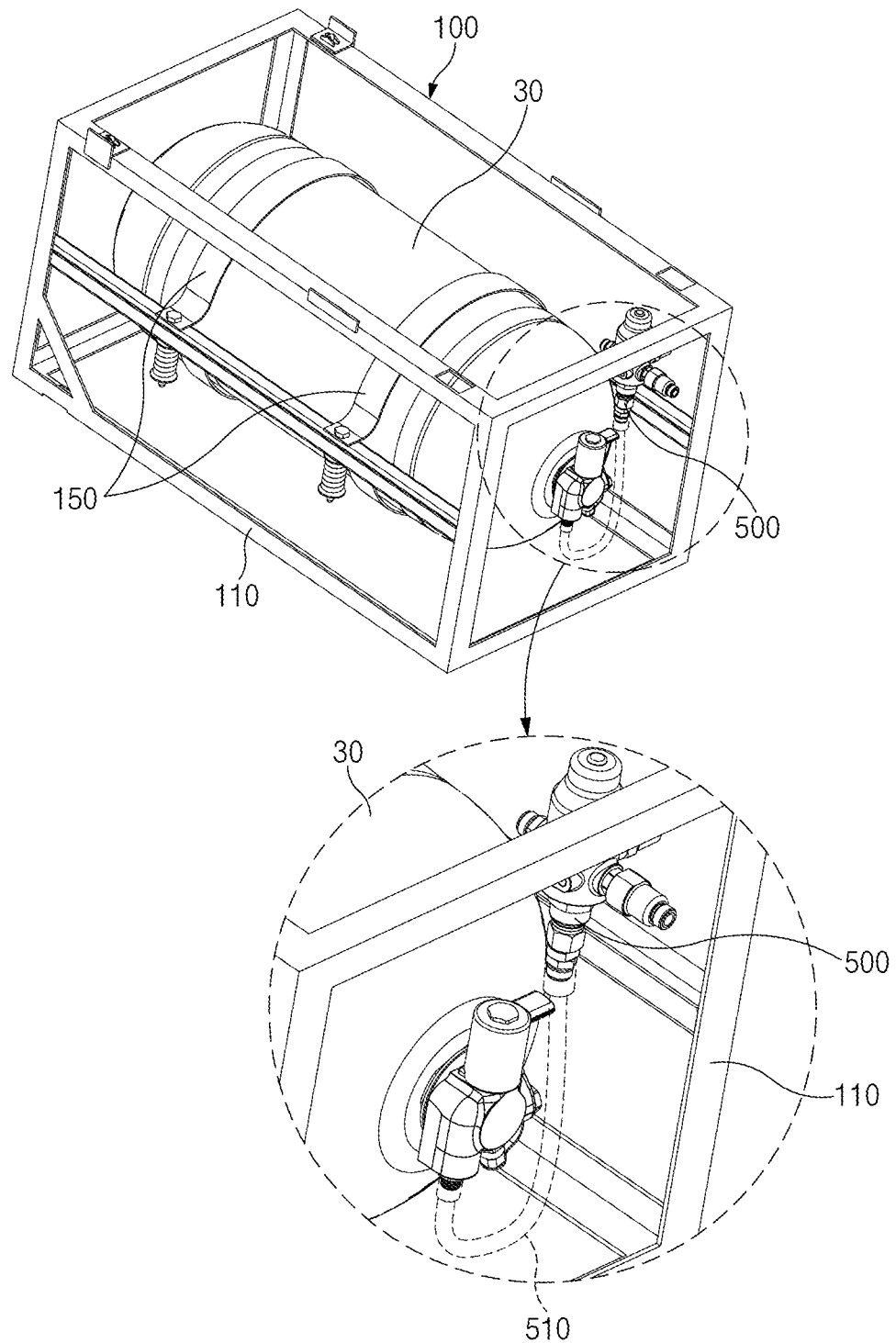
FIG. 3 is a view for explaining a regulator of the apparatus for fixing a pressure vessel according to the embodiment of the present disclosure.

Meanwhile, referring to FIG. 3, according to the exemplary embodiment of the present disclosure, the apparatus 20 for fixing a pressure vessel may include regulators 500 disposed on the frame part 100, and flexible connection members 600 configured to connect the regulators 500 to the pressure vessels 30 so that the regulators 500 communicate with the pressure vessels 30, respectively.

In this case, the configuration in which the regulators 500 are disposed on the frame part 100 may mean that the regulators 500 are respectively disposed on the plurality of frame members (e.g., the first frame member, the second frame member, and the third frame member) constituting the frame part 100.

The regulator 500 may serve to reduce a pressure of high-pressure hydrogen (e.g., 700 bar→16 bar) to be supplied to the pressure vessel 30. The present disclosure is not restricted or limited by the type and structure of the regulator 500.

Various members capable of connecting the regulator 500 and the pressure vessel 30 so that the regulator 500 and the pressure vessel 30 communicate with each other may be used as the flexible connection member 600. The present disclosure is not restricted or limited by the type and structure of the flexible connection member 600.

For example, a typical flexible high-pressure hose may be used as the flexible connection member 600.

As described above, according to the embodiment of the present disclosure, the regulators 500 may be respectively disposed on the first frame member 110, the second frame member 120, and the third frame member, which constitute the frame part 100, and the pressure vessels 30 and the regulators 500 may be connected by means of the flexible high-pressure hoses. Therefore, the pressure vessel 30 and the regulator 500 may be accurately assembled even though the pressure vessel 30 is inaccurately mounted on the first frame member 110 during the process of replacing the pressure vessel 30. Therefore, it is possible to obtain an advantageous effect of improving the safety and reliability and minimizing a leakage of hydrogen from a tube (e.g., the flexible high-pressure hose) for connecting the pressure vessel 30 and the regulator 500.

That is, a structure for connecting the pressure vessel 30 and the regulator 500 using a rigid tube (e.g., a SUS tube) has a problem in that the tube for connecting the pressure vessel 30 and the regulator 500 is difficult to accurately assemble and a risk of leakage of hydrogen from a connection portion of the tube increases when the pressure vessel 30 is inaccurately mounted on the first frame member 110 (with assembly tolerance) during the process of replacing and mounting the pressure vessel 30.

However, according to the embodiment of the present disclosure, the pressure vessel 30 and the regulator 500 are connected by means of the flexible connection member 600 having the flexibility, such that the flexible connection member 600 may be accurately assembled at the exact position regardless of the inaccuracy in mounting the pressure vessel 30 on the first frame member 110. Therefore, it is possible to obtain an advantageous effect of improving the safety and reliability and reducing the risk of leakage of hydrogen from the connection portion of the flexible connection member 600.

In the embodiment of the present disclosure illustrated and described above, the example has been described in which the height of the lifting table 210 is adjusted by directly rotating the connection link member 220 using the cylinder 232 having a selectively variable length. However, according to another embodiment of the present disclosure, a rectilinearly movable member 240 and a guide link member 250, which operate in conjunction with each other by the cylinder 232 may be used to adjust the height of the lifting table 210 by rotating the connection link member 220.

Figure 14:
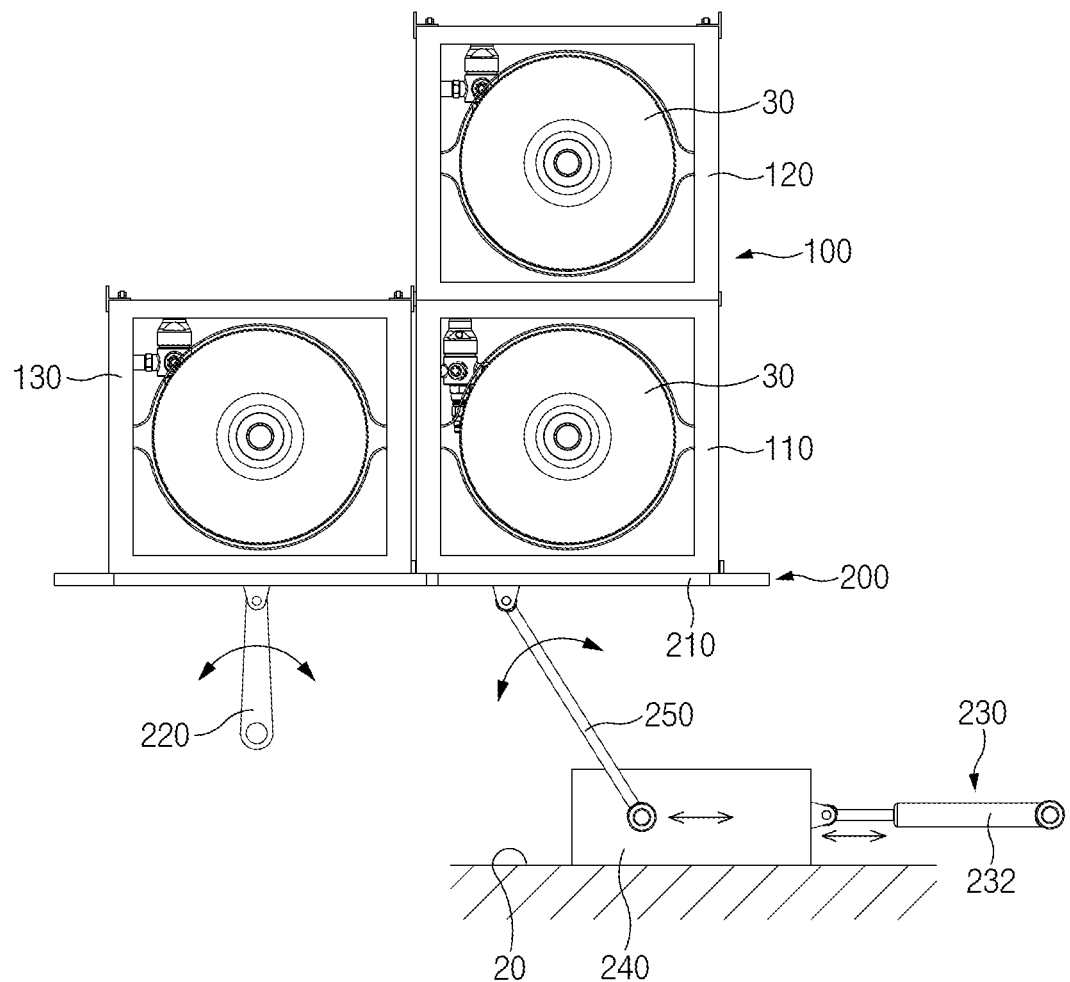
FIGS. 14 and 15 are views for explaining a modified example of the lifting device of the apparatus for fixing a pressure vessel according to the embodiment of the present disclosure.

Referring to FIG. 14, according to the exemplary embodiment of the present disclosure, the apparatus 20 for fixing a pressure vessel may include: the rectilinearly movable member 240 configured to rectilinearly move relative to the subject 10 depending on a change in length of the cylinder 232; and the guide link member 250 having one end rotatably connected to the lifting table 210, and the other end rotatably connected to the rectilinearly movable member 240.

For example, the rectilinearly movable member 240 may rectilinearly move relative to the subject 10 (e.g., the chassis of the construction machine) in a direction (the leftward/rightward direction based on FIG. 14) in which the cylinder 232 is stretched or compressed.

The rectilinearly movable member 240 may have various structures in accordance with required conditions and design specifications. The present disclosure is not restricted or limited by the structure of the rectilinearly movable member 240.

The guide link member 250 may be provided in the form of a link arm having a predetermined length. One end (an upper end based on FIG. 14) of the guide link member 250 may be rotatably connected to the lifting table 210, and the other end (a lower end based on FIG. 14) of the guide link member 250 may be rotatably connected to the rectilinearly movable member 240.

With the above-mentioned configuration, the guide link member 250 rotates in conjunction with the rectilinear movement of the rectilinearly movable member 240 by the cylinder 232, such that the height of the lifting table 210 may be selectively adjusted (e.g., H1 in FIG. 4↔H2 in FIG. 5).

In the embodiment of the present disclosure illustrated and described above, the example has been described in which the height of the lifting table 210 is adjusted by means of the rectilinearly movable member 240 that rectilinearly moves relative to the subject 10 depending on a change in length of the cylinder 232. However, according to another embodiment of the present disclosure, the height of the lifting table 210 may be adjusted by means of a rotary member that rotates relative to the subject 10 depending on a change in length of the cylinder 232.

According to the exemplary embodiment of the present disclosure, the apparatus 20 for fixing a pressure vessel may include support members 400 configured to support the lifting table 210 on the subject 10.

In this case, the configuration in which the support member 400 supports the lifting table 210 on the subject 10 may include both a configuration in which the support member 400 supports the lifting table 210 on the subject 10 in a state in which the lifting table 210 is disposed at the first position and a configuration in which the support member 400 supports the lifting table 210 on the subject 10 in a state in which the lifting table 210 is disposed at the second position.

Figure 16:
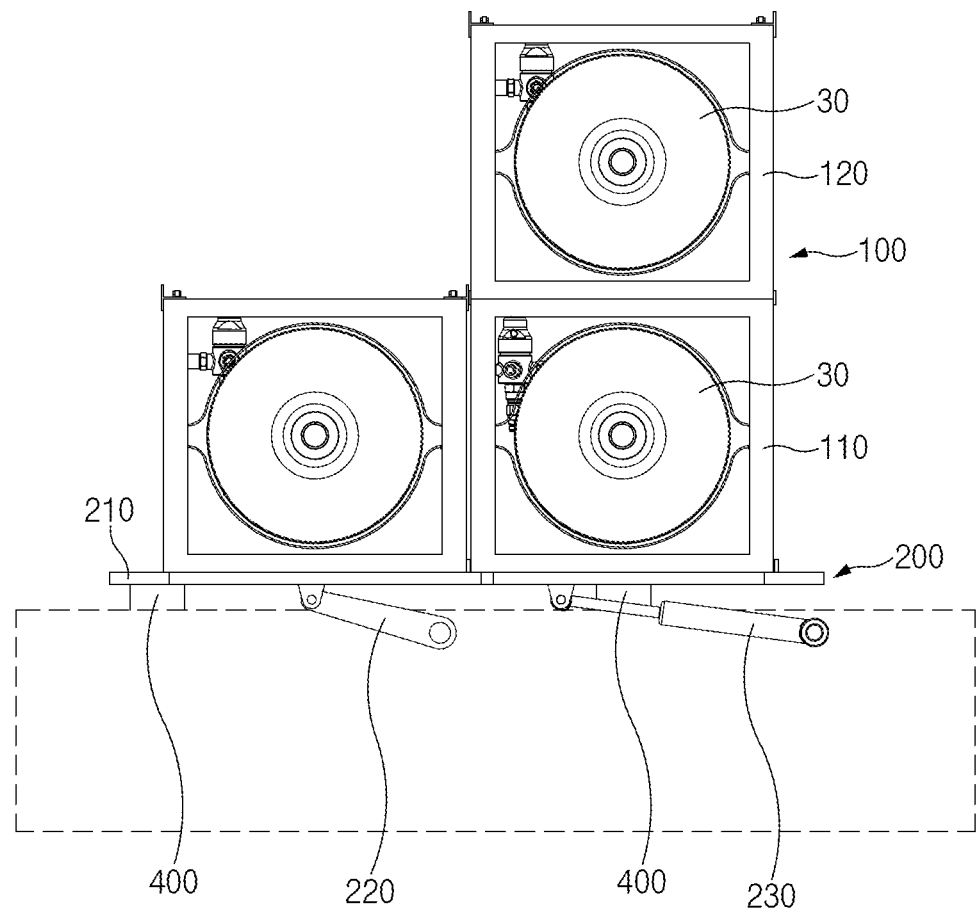
FIG. 16 is a view for explaining a support member of the apparatus for fixing a pressure vessel according to the embodiment of the present disclosure.

For example, referring to FIG. 16, the support member 400 may be disposed on the lower surface of the lifting table 210, and the lifting table 210 may be supported on the subject 10 by means of the support member 400 in the state in which the lifting table 210 is disposed at the second position.

The support member 400 may have various structures capable of supporting the lower surface of the lifting table 210. The present disclosure is not restricted or limited by the structure of the support member 400. For example, the support member 400 may be provided in the form of a column or block.

According to another embodiment of the present disclosure, the support member 400 may be disposed on the subject 10 instead of the lower surface of the lifting table 210, and the lifting table 210 may be supported at an upper end of the support member 400 when the lifting table 210 is disposed at the second position.

Since the lifting table 210 is supported by the support member 400 as described above, it is possible to obtain an advantageous effect of improving the safety and reliability and further securely maintaining the arranged state of the pressure vessel 30 seated on the lifting table 210.

According to the present disclosure described above, it is possible to obtain an advantageous effect of facilitating the process of replacing the pressure vessel.

In particular, according to the embodiment of the present disclosure, it is possible to relatively reduce the height at which the pressure vessel is disposed during the process of replacing the pressure vessel. Therefore, the operator may replace the pressure vessel in a safer and more convenient posture.

In addition, according to the embodiment of the present disclosure, it is possible to obtain an advantageous effect of quickly and accurately replacing the pressure vessel regardless of a workplace.

In addition, according to the embodiment of the present disclosure, it is possible to obtain an advantageous effect of improving the satisfaction of the operator and simplifying the process of replacing the pressure vessel.

In addition, according to the exemplary embodiment of the present disclosure, it is possible to obtain an advantageous effect of improving the safety and reliability and reducing the risk of occurrence of a safety accident.

In addition, according to the embodiment of the present disclosure, it is possible to obtain an advantageous effect of supplementing fuel in a timely manner without limitation in respect to a workplace or a fuel charging station.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. An apparatus for fixing a pressure vessel to a subject, the apparatus comprising:
   a frame part disposed separably from the subject and configured to support the pressure vessel; and
   a lifting device configured to selectively raise or lower the frame part between a first position with a first height and a second position with a second height lower than the first height with respect to the subject,
   wherein the lifting device comprises:
      a lifting table on which the frame part is seated;
      a connection link member having one end rotatably connected to the lifting table and the other end rotatably connected to the subject; and
      a stretchable part selectively stretchable and configured to connect the lifting table and the subject, and
   wherein the lifting table is raised or lowered between the first position and the second position depending on a change in length of the stretchable part.

2. The apparatus of claim 1, wherein the stretchable part comprises a cylinder having one end connected to the lifting table and the other end connected to the subject, the cylinder having a selectively variable length.

3. The apparatus of claim 2, comprising:
   a rectilinearly movable member configured to rectilinearly move relative to the subject depending on a change in length of the cylinder; and
   a guide link member having one end rotatably connected to the lifting table and the other end rotatably connected to the rectilinearly movable member.

4. The apparatus of claim 1, comprising:
   a lifting guide part configured to guide the raising or lowering of the frame part relative to the subject,
   wherein the lifting guide part comprises:
      a lifting guide member disposed on the subject and having a guide slot; and a guide protrusion disposed on the frame part and accommodated in the guide slot so as to be movable along the guide slot.

5. The apparatus of claim 1, comprising:
a rolling member provided in the lifting device so as to be in rollable contact with the frame part.

6. The apparatus of claim 5, comprising:
an accommodation portion disposed on the frame part, and configured to selectively accommodate the rolling member so as to restrict a rolling motion of the rolling member relative to the frame part is restricted.

7. The apparatus of claim 5, comprising:
a guide member provided in the lifting device and configured to guide a rolling motion of the rolling member relative to the frame part.

8. The apparatus of claim 1, comprising:
a rolling member disposed on the frame part so as to be in rollable contact with the lifting device.

9. The apparatus of claim 8, comprising:
an accommodation portion provided in the lifting device, and configured to selectively accommodate the rolling member so as to restrict a rolling motion of the rolling member relative to the lifting device.

10. An apparatus for fixing a pressure vessel to a subject, the apparatus comprising:
a frame part disposed separably from the subject and configured to support the pressure vessel; and
a lifting device configured to selectively raise or lower the frame part relative to the subject,
wherein the frame part comprises:
a first frame member; and
a second frame member disposed individually and separably from the first frame member, and
wherein the apparatus further comprises another pressure vessel, and the pressure vessel and the another pressure vessel are respectively provided in the first frame member and the second frame member.

11. The apparatus of claim 10, wherein the second frame member is stacked on an upper portion of the first frame member.

12. The apparatus of claim 11, comprising:
a lower rolling member disposed on the first frame member so as to be in rollable contact with the second frame member.

13. The apparatus of claim 12, comprising:
an upper accommodation portion disposed on the second frame member, and configured to selectively accommodate the lower rolling member so as to restrict a rolling motion of the lower rolling member relative to the second frame member.

14. The apparatus of claim 12, comprising:
a support bracket disposed on the first frame member and configured to support the lower rolling member so that the lower rolling member is rotatable.

15. The apparatus of claim 14, comprising:
a guide partition wall extending from the support bracket and configured to guide a rolling motion of the lower rolling member relative to the second frame member.

16. The apparatus of claim 12, comprising:
a partition wall member disposed on the first frame member and configured to guide a rolling motion of the lower rolling member relative to the second frame member.

17. The apparatus of claim 11, comprising:
an upper rolling member disposed on the second frame member so as to be in rollable contact with the first frame member.

18. The apparatus of claim 17, comprising:
a lower accommodation portion disposed on the first frame member, and configured to selectively accommodate the upper rolling member so as to restrict a rolling motion of the upper rolling member relative to the first frame member.

* * * * *